Patented Feb. 28, 1933

1,899,760

UNITED STATES PATENT OFFICE

NORBERT KREIDL, OF REITENDORF A/TESS, CZECHOSLOVAKIA, ASSIGNOR TO FIRM GLASHUTTENWERKE VORM. J. SCHREIBER & NEFFEN, OF REITENDORF A/TESS, CZECHOSLOVAKIA

CHANGEANT OR OPALESCENT GLASS

No Drawing. Application filed July 30, 1930, Serial No. 471,894, and in Czechoslovakia August 8, 1929.

This invention relates to a process for the manufacture of changeant or opalescent glass and to the product resulting therefrom. For this purpose fluorescent glass colours have been heretofore exclusively used, such as in particular the oxides of uranium, neodymium and praseodymium. The use of fluorescent glass colours is based upon their dichroic properties. The light passing through is not coloured or only feebly so, while the light reflected from its surface (fluorescent light) is intensely coloured.

The present invention is based on the discovery that the changeant-effect is increased when a fluorescent glass—that is a glass colored with fluorescent producing oxides or a glass layer so colored—is flashed or covered with one or more differently coloured, suitably intensely coloured, glasses or layers of glass, or inversely when a glass ordinarily coloured in one or more layers is flashed or covered with one or more fluorescent glass layers of another colour. By these means it is achieved that at all places with normal colour-subtraction, the flash- or cover-colour is practically exclusively visible, while at reflecting or optic places, the fluorescent colour appears almost exclusively on account of this colour predominating.

Reflecting and optic places are all such places of the glass body which stand out in the smooth or plane surface of the glass, such as for instance depressions, cut or ground surfaces, projecting surfaces, ribs and the like, further rims or "optic" edges, transition surfaces, penetration surfaces etc., as is mostly the case with hollow glassware, table glassware, solid glassware and the like.

Thus, for example, an uranium-green coloured so called "optic" glass cup which has been flashed or covered ruby-red shows a dull-red colour with a green rim of the cup, green "optic" strips and green "ice" (that means the lower portion of the cup-goblet adjacent to the stem).

By making the flashed layers of glass with suitable layer-thickness, as for instance by forming differently thick layers, by suitably selecting the intensity of the shades of the colours of the flashed glass-layers, etc., the changeant or opalescent effect can be correspondingly influenced.

Also a method of carrying out the invention can be made use of which consists in superimposing the flashed layers of glass in such a manner that they lie in the form of oppositely directed wedges one above the other or merge one into the other, so that the thickness of the superimposed layers varies in each cross-section, or differs at various places, a concave or convex line of demarcation, thereby, giving the best effect.

With glasses comprising more than two layers also colourless layers of glass can be made use of.

What I claim is:

1. A changeant glass comprising a plurality of layers, at least one of which is of a fluorescent light-transmitting glass and at least one of which is a differently intensely colored, light-transmitting glass.

2. A changeant glass according to claim 1, wherein the glass is optically heterogeneous.

3. A changeant glass according to claim 1, wherein the glass is optically heterogeneous for different angles of vision.

4. A changeant glass comprising a plurality of layers, at least one of which is of a fluorescent light-transmitting glass, at least one of which is of a differently intensely colored light-transmitting glass, and one of which is colorless glass.

5. A changeant glass comprising a plurality of layers, at least one of which is of a fluorescent transparent glass and at least one of which is of a differently intensely colored glass, the colors of the said glass layers being such that one layer is at least partially transparent to the light rays transmitted by the other layer.

6. A changeant glass comprising a plurality of layers, at least one of which is of a fluorescent transparent glass and at least one of which is of a differently intensely colored glass, the colors of the glass layers being such that the outer layer is at least partially transparent to the rays transmitted by the inner layer.

In witness whereof I have hereunto signed my name.

NORBERT KREIDL.